US009554035B2

(12) United States Patent
Sugita

(10) Patent No.: US 9,554,035 B2
(45) Date of Patent: Jan. 24, 2017

(54) IMAGE PICKUP DEVICE, METHOD OF CONTROLLING IMAGE PICKUP DEVICE, AND COMPUTER PROGRAM FOR AUTOMATICALLY ACHIEVING COMPOSITION SPECIFIED BY USER

(71) Applicant: SONY CORPORATION, Tokyo (JP)

(72) Inventor: Yusuke Sugita, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/763,091

(22) PCT Filed: Jan. 22, 2014

(86) PCT No.: PCT/JP2014/051219

§ 371 (c)(1),
(2) Date: Jul. 23, 2015

(87) PCT Pub. No.: WO2014/122990

PCT Pub. Date: Aug. 14, 2014

(65) Prior Publication Data

US 2015/0373260 A1 Dec. 24, 2015

(30) Foreign Application Priority Data

Feb. 7, 2013 (JP) ................................ 2013-022247

(51) Int. Cl.
*H04N 5/262* (2006.01)
*H04N 5/232* (2006.01)
(Continued)

(52) U.S. Cl.
CPC ............ *H04N 5/23222* (2013.01); *G03B 9/64* (2013.01); *H04N 5/2353* (2013.01); *H04N 5/23216* (2013.01)

(58) Field of Classification Search
CPC .............................. H04N 5/23216; G03B 9/64
See application file for complete search history.

(56) References Cited

U.S. PATENT DOCUMENTS 7,415,201 B2 * 8/2008 Matsumoto ............ G02B 7/102 250/201.2
2006/0132623 A1 * 6/2006 Nozaki ............. H04N 5/23248 348/231.99

(Continued)

FOREIGN PATENT DOCUMENTS

JP 10232418 A * 9/1998
JP 2002-335436 A 11/2002

(Continued)

*Primary Examiner* — Gary C Vieaux
(74) *Attorney, Agent, or Firm* — Chip Law Group

(57) ABSTRACT

There is provided an image pickup device including: a composition detection unit configured to calculate a time at which an object that is specified by a user and is included in a captured image achieves a composition specified by the user; a time calculation unit configured to calculate a time after start instruction of image pickup operation is issued but before an image is captured; and an image pickup control unit configured to start image pickup processing of the image in response to the start instruction of the image pickup operation. The composition detection unit issues the start instruction of the image pickup operation to the image pickup control unit the time calculated by the time calculation unit before the time at which the composition specified by the user is achieved.

11 Claims, 8 Drawing Sheets

100
120
REACH AFTER 900 ms IS EXPECTED
130

(51) Int. Cl.
*G03B 9/64* (2006.01)
*H04N 5/235* (2006.01)

(56) References Cited

U.S. PATENT DOCUMENTS

| | | | | |
|---|---|---|---|---|
| 2008/0199169 | A1* | 8/2008 | Yoshida | G03B 3/10 396/95 |
| 2011/0141344 | A1* | 6/2011 | Abe | G03B 3/00 348/345 |
| 2011/0228128 | A1* | 9/2011 | Ikeda | G03B 7/097 348/222.1 |

FOREIGN PATENT DOCUMENTS

| | | | | |
|---|---|---|---|---|
| JP | 2003222790 | A | * | 8/2003 |
| JP | 2005-215373 | A | | 8/2005 |
| JP | 2011-139498 | A | | 7/2011 |
| JP | 2012-099984 | A | | 5/2012 |

* cited by examiner

IMAGE PICKUP DEVICE, METHOD OF CONTROLLING IMAGE PICKUP DEVICE, AND COMPUTER PROGRAM FOR AUTOMATICALLY ACHIEVING COMPOSITION SPECIFIED BY USER

TECHNICAL FIELD

The present disclosure relates to an image pickup device, a method of controlling an image pickup device, and a computer program.

BACKGROUND ART

There has been widely used a digital camera that performs digital coding on an image captured by an image sensor including a solid-state image pickup element such as a charge coupled device (CCD) or a complementary metal oxide semiconductor (CMOS), instead of a silver halide camera for taking a photograph with the use of a film or a photographic plate. According to a digital camera, it is possible to store an image that has been subjected to digital coding in a memory, thereby performing image processing and image management with the use of a computer, and further there is no problem in terms of the life of a film.

By using a digital camera that electronically captures a photograph, a user who is not accustomed to operation can easily take a clear photograph. However, it is difficult for a beginner to instantly learn a skill regarding at which timing a shutter release button should be pushed to take a photograph having a good composition.

In view of this, there is devised a technology for allowing a beginner who is not accustomed to handling of a digital camera to easily take a photograph having a good composition, and literatures disclosing such a technology are published.

For example, Patent Literature 1 discloses a technology in which a digital camera detects a composition to automatically execute image pickup processing and, when a composition specified by a user is detected, the detection is notified to the user. Patent Literature 2 discloses a technology in which an image inputted from an optical finder is displayed on a screen of a digital camera in order to prevent a failure of photographing caused by a time lag after a shutter release button is pushed but before operation for exposing light to an image pickup element is started.

CITATION LIST

Patent Literature

Patent Literature 1: JP 2011-139498A
Patent Literature 2: JP 2012-99984A

SUMMARY OF INVENTION

Technical Problem

However, in a case where a composition is detected to execute automatic image pickup, in a usual digital camera, a time lag from the detection of the composition to start of image pickup operation exists, and therefore a composition to be captured and an image actually captured are different. In particular, this phenomenon is remarkable in a case where an object moving at a high speed is captured. Even in a case where the technology disclosed in Patent Literature 2 is used, a timing of operation of a shutter release button ultimately depends on a user, and therefore the time lag from the detection of the composition to the start of the image pickup operation is not solved.

In view of this, the present disclosure provides an image pickup device, a method of controlling the image pickup device, and a computer program, each of which is novel and improved and is capable of executing detection of a composition and automatic image pickup processing in consideration of a time lag from the detection of the composition to start of image pickup operation.

Solution to Problem

According to the present disclosure, there is provided an image pickup device including: a composition detection unit configured to calculate a time at which an object that is specified by a user and is included in a captured image achieves a composition specified by the user; a time calculation unit configured to calculate a time after start instruction of image pickup operation is issued but before an image is captured; and an image pickup control unit configured to start image pickup processing of the image in response to the start instruction of the image pickup operation. The composition detection unit issues the start instruction of the image pickup operation to the image pickup control unit the time calculated by the time calculation unit before the time at which the composition specified by the user is achieved.

According to the present disclosure, there is provided a method of controlling an image pickup device, including: calculating a time at which an object that is specified by a user and is included in a captured image achieves a composition specified by the user; calculating a time after start instruction of image pickup operation is issued but before an image is captured; and starting image pickup processing of the image in response to the start instruction of the image pickup operation. The start instruction of the image pickup operation is issued the calculated time before the time at which the composition specified by the user is achieved.

According to the present disclosure, there is provided a computer program that causes a computer to: calculate a time at which an object that is specified by a user and is included in a captured image achieves a composition specified by the user; calculate a time after start instruction of image pickup operation is issued but before an image is captured; and start image pickup processing of the image in response to the start instruction of the image pickup operation. The start instruction of the image pickup operation is issued the calculated time before the time at which the composition specified by the user is achieved.

Advantageous Effects of Invention

As described above, according to the present disclosure, it is possible to provide an image pickup device, a method of controlling the image pickup device, and a computer program, each of which is novel and improved and is capable of executing detection of a composition and automatic image pickup processing in consideration of a time lag from the detection of the composition to start of image pickup operation.

DESCRIPTION OF EMBODIMENTS

Hereinafter, preferred embodiments of the present disclosure will be described in detail with reference to the appended drawings. Note that, in this specification and the drawings, elements that have substantially the same function and structure are denoted with the same reference signs, and repeated explanation is omitted.

Note that description will be provided in the following order.

<1. One embodiment of present disclosure>

[External appearance example of image pickup device]

[Functional configuration example of image pickup device]

[Operation example of image pickup device]

<2. Conclusion>

1. ONE EMBODIMENT OF PRESENT DISCLOSURE

External Appearance Example of Image Pickup Device

Figure 1:
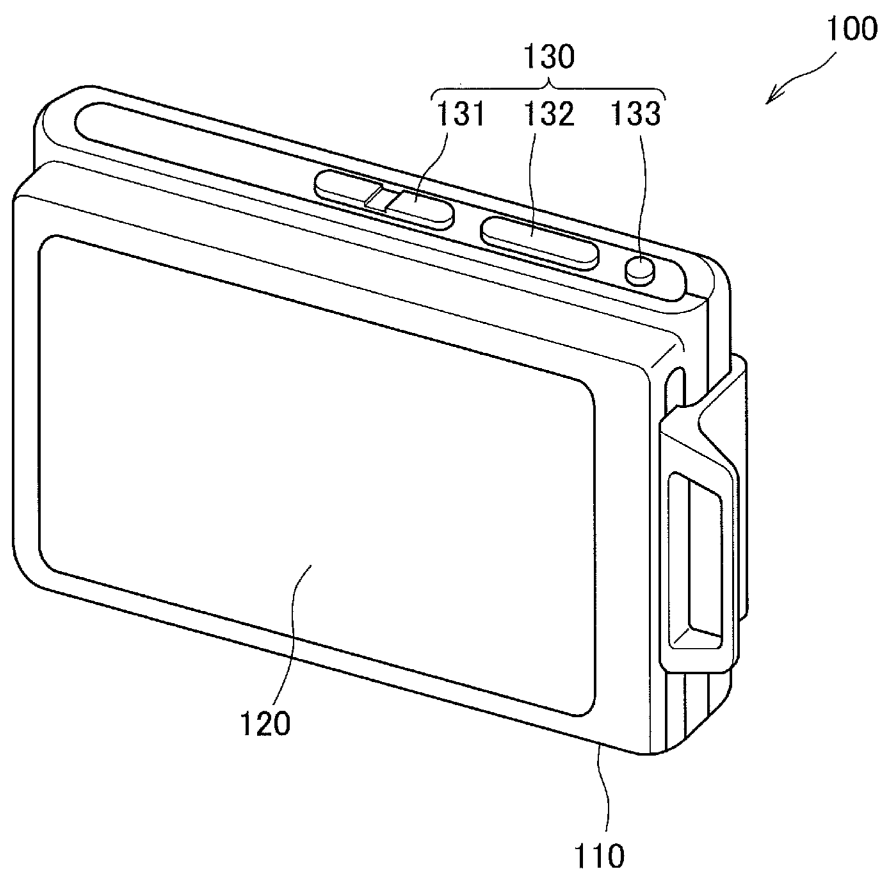
FIG. 1 is an explanatory diagram illustrating an external appearance example of an image pickup device 100 according to an embodiment of the present disclosure, which illustrates a perspective view seen from a back surface side of the image pickup device 100.

With reference to the drawings, there will be described an external appearance example of an image pickup device according to an embodiment of the present disclosure as an example of an information processing device of the present disclosure. FIG. 1 is an explanatory diagram illustrating an external appearance example of an image pickup device 100 according to the embodiment of the present disclosure, which illustrates a perspective view seen from a back surface side of the image pickup device 100. Hereinafter, with reference to FIG. 1, there will be described the external appearance example of the image pickup device 100 according to the embodiment of the present disclosure.

As illustrated in FIG. 1, the image pickup device 100 according to the embodiment of the present disclosure includes a display unit 120 and an operation unit 130 in a housing 101.

The display unit 120 displays an image captured by the image pickup device 100 or displays various kinds of setting screens of the image pickup device 100. As described below, a touch panel is provided in the display unit 120, and a user who uses the image pickup device 100 can operate the image pickup device 100 by touching the touch panel provided in the display unit 120 with an operation member such as a finger.

The operation unit 130 causes a user to operate the image pickup device 100 and includes a button, a switch, and the like for operating the image pickup device 100. FIG. 1 illustrates, as the operation unit 130, a zoom button 131, a shutter button 132, and a power button 133. The zoom button 131 is a button for changing a magnification at the time of image pickup in the image pickup device 100. The shutter button 132 is a button for capturing an image in the image pickup device 100. The power button 133 is a button for turning on/off a power source of the image pickup device 100.

It is needless to say that the external appearance of the image pickup device 100 is not limited to the above example. It is also needless to say that the button and the switch constituting the operation unit 130 are not limited to those illustrated in FIG. 1.

The image pickup device 100 according to the embodiment of the present disclosure automatically starts image pickup operation when an object specified by a user reaches a position specified by the user. At the time of the automatic image pickup operation, the image pickup device 100 according to the embodiment of the present disclosure considers a time lag from detection of a composition to start of the image pickup operation. By considering the time lag from the detection of the composition to the start of the image pickup operation, the image pickup device 100 according to the embodiment of the present disclosure can achieve image pickup in the composition intended by the user.

It is needless to say that the external appearance of the image pickup device 100 according to the embodiment of the present disclosure illustrated in FIG. 1 is merely an example and, as the external appearance of the image pickup device 100, not only the external appearance illustrated in FIG. 1 but also various forms can be employed.

In the above description, with reference to FIG. 1, there has been described the external appearance example of the image pickup device 100 according to the embodiment of the present disclosure. Next, there will be described a functional configuration example of the image pickup device 100 according to the embodiment of the present disclosure.

Functional Configuration Example of Image Pickup Device

Figure 2:
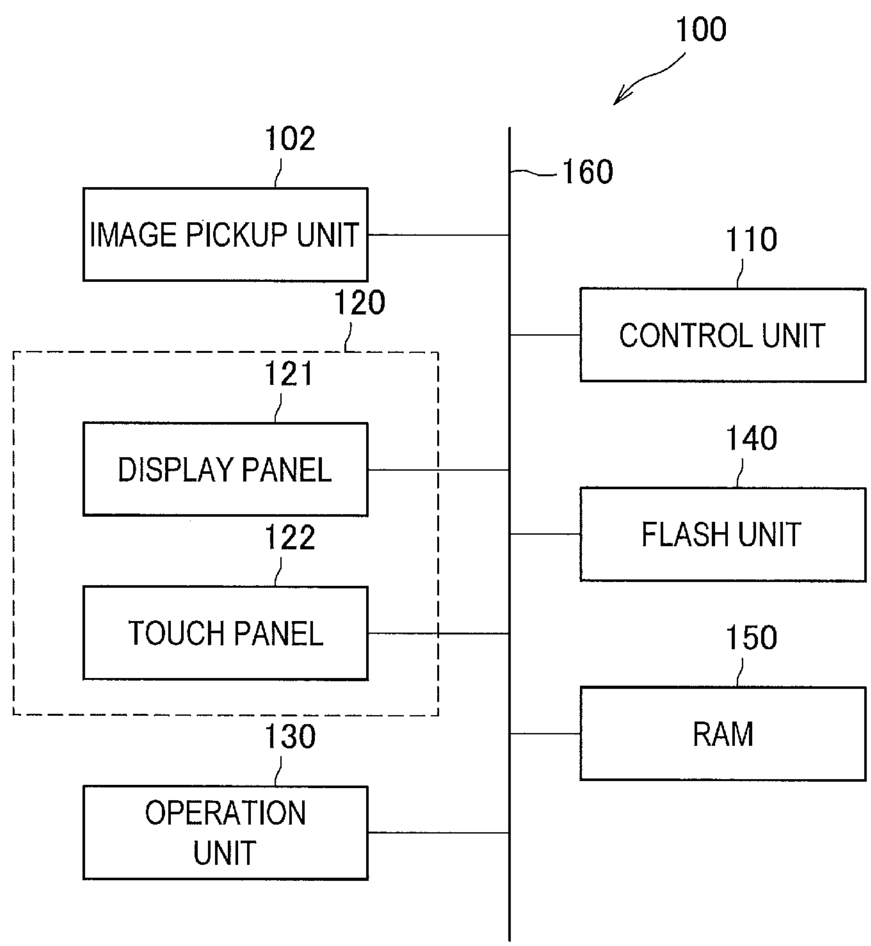
FIG. 2 is an explanatory diagram illustrating a functional configuration example of the image pickup device 100 according to an embodiment of the present disclosure.

FIG. 2 is an explanatory diagram illustrating the functional configuration example of the image pickup device 100 according to the embodiment of the present disclosure. Hereinafter, with reference to FIG. 2, there will be described the functional configuration example of the image pickup device 100 according to the embodiment of the present disclosure.

As illustrated in FIG. 2, the image pickup device 100 according to the embodiment of the present disclosure includes an image pickup unit 102, a control unit 110, the display unit 120, the operation unit 130, a flash memory 140, and a RAM 150.

The image pickup unit 102 includes, for example, an imager including a solid-state image pickup element such as a lens, a charge coupled device (CCD), or a complementary metal oxide semiconductor (CMOS), a timing generator that controls, for example, an exposure timing to an image sensor, a sample and hold circuit, and an interface unit that provides original data of an image obtained by exposure to the imager to the following circuit. Note that, in this embodiment, there has been described a configuration in which the image pickup unit 102 is provided in the image pickup device 100. However, the present disclosure is not limited to the above example, and the lens may be detachable from the image pickup device 100.

The control unit 110 controls operation of the image pickup device 100. The control unit 110 may control the operation of the image pickup device 100 by, for example, reading computer programs recorded in the flash memory 140 and sequentially executing the computer programs. A specific configuration example of the control unit 110 will be described below.

As described above, the display unit 120 displays an image captured by the image pickup device 100 with the use of the image pickup unit 102 and displays various kinds of setting screens of the image pickup device 100. As illustrated in FIG. 2, the display unit 120 includes a display panel 121 and a touch panel 122. The display panel 121 displays an image captured by the image pickup device 100 and displays various kinds of setting screens of the image pickup device 100 and includes, for example, a flat display panel such as a liquid crystal display panel or an organic electroluminescence display panel. The touch panel 122 is provided in a display surface of the display panel 121. A user can operate the image pickup device 100 by touching the touch panel 122 with the use of the operation member such as a finger. Therefore, the control unit 110 executes various kinds of processing in response to a state of touching the touch panel 122 with the use of the operation member.

As described above, the operation unit 130 causes a user to operate the image pickup device 100 and includes the button, the switch, and the like for operating the image pickup device 100. The control unit 110 executes various kinds of processing in response to an operation state of the operation unit 130. Examples of the various kinds of processing executed by the control unit 110 in response to the operation state of the operation unit 130 include processing of turning on/off the power source of the image pickup device 100, processing of changing magnification at the time of image pickup, processing of changing other image pickup conditions, and processing of capturing a still image or a moving image.

The flash memory 140 is a nonvolatile memory in which various kinds of computer programs needed to perform the processing of the control unit 110 and various kinds of data are stored. The RAM 150 is a working memory used at the time of the processing of the control unit 110.

Note that the control unit 110, the display unit 120, the operation unit 130, the flash memory 140, and the RAM 150 are connected to one another via a bus 160 and can communicate with one another.

In the above description, with reference to FIG. 2, there has been described the functional configuration example of the image pickup device 100 according to the embodiment of the present disclosure. Next, there will be described a functional configuration example of the control unit 110 included in the image pickup device 100 according to the embodiment of the present disclosure.

Figure 3:
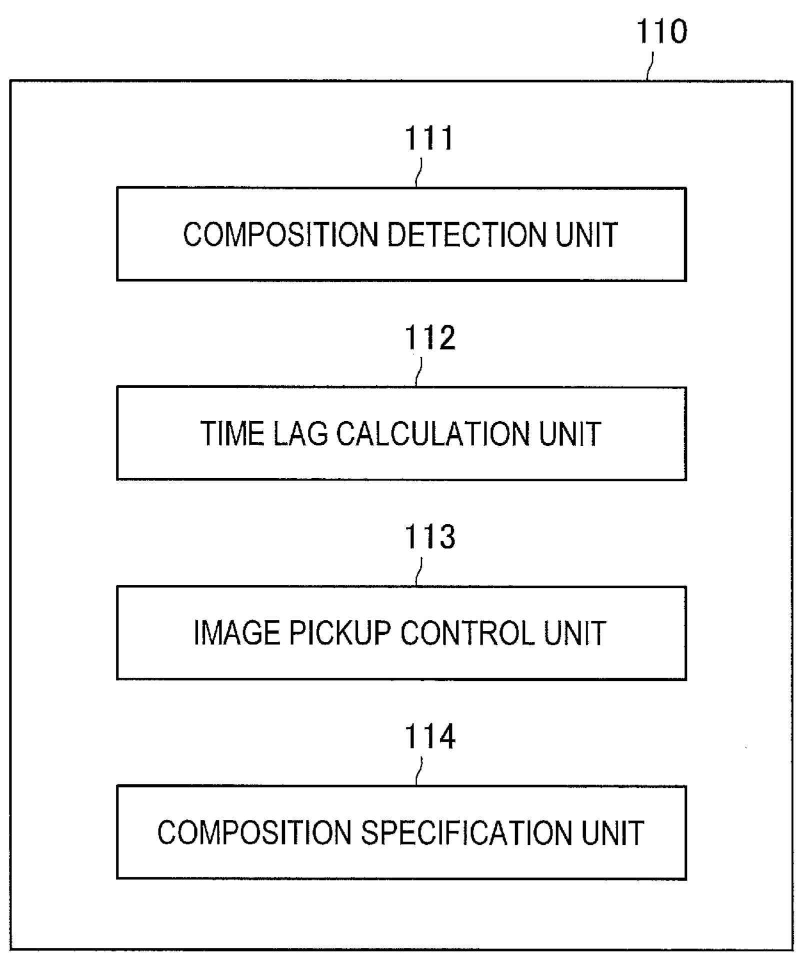
FIG. 3 is an explanatory diagram illustrating a functional configuration example of a control unit 110 included in the image pickup device 100 according to an embodiment of the present disclosure.

FIG. 3 is an explanatory diagram illustrating the functional configuration example of the control unit 110 included in the image pickup device 100 according to the embodiment of the present disclosure. Hereinafter, with reference to FIG. 3, there will be described the functional configuration example of the control unit 110 included in the image pickup device 100 according to the embodiment of the present disclosure.

As illustrated in FIG. 3, the control unit 110 according to the embodiment of the present disclosure includes a composition detection unit 111, a time lag calculation unit 112, an image pickup control unit 113, and a composition specification unit 114.

The composition detection unit 111 detects whether or not an image captured by the image pickup unit 102 has a composition intended by a user. In this embodiment, the composition detection unit 111 detects whether or not the image captured by the image pickup unit 102 has the composition intended by the user by detecting whether or not a feature point of an object specified by the user is positioned in a location specified by the user on the display unit 120. In a case where the feature point of the object specified by the user exits in the image captured by the image pickup unit 102, the composition detection unit 111 calculates a time it takes for the feature point to reach the location specified by the user on the display unit 120.

In a case where the composition detection unit 111 detects that the feature point of the object specified by the user exists in the location specified by the user on the display unit 120, the composition detection unit 111 issues a trigger for automatically starting the image pickup operation to the image pickup control unit 113 (described below).

However, after the composition detection unit 111 issues the trigger to the image pickup control unit 113 but before the image pickup control unit 113 starts image pickup processing, there exists a time lag caused by a hardware factor and a software factor of the image pickup device 100 and an environment at the time of image pickup. Therefore, in a case where the composition detection unit 111 issues the trigger to the image pickup control unit 113 when the feature point of the object specified by the user exists in the location specified by the user on the display unit 120, it is not possible to obtain an image having the composition intended by the user if the object moves.

In view of this, in this embodiment, the time lag calculation unit 112 (described below) calculates a time after the composition detection unit 111 issues the trigger to the image pickup control unit 113 but before the image pickup control unit 113 starts the image pickup processing. Then, the composition detection unit 111 issues the trigger for automatically starting the image pickup operation to the image pickup control unit 113 in consideration of the time calculated by the time lag calculation unit 112.

As described above, the image pickup device 100 according to this embodiment can obtain an image having the composition intended by the user by considering the time after the composition detection unit 111 issues the trigger to the image pickup control unit 113 but before the image pickup control unit 113 starts the image pickup processing.

As described above, the time lag calculation unit 112 calculates the time (time lag) after the composition detection unit 111 issues the trigger to the image pickup control unit 113 but before the image pickup control unit 113 starts the image pickup processing. As described above, the time lag is caused by the hardware factor and the software factor of the image pickup device 100 and the environment at the time of the image pickup.

Examples of the factors causing the time lag include inherent processing speed of the image pickup device 100, driving speed of a shutter curtain and an aperture of the image pickup device 100, inherent driving speed of a shutter curtain and an aperture of the lens, processing speed that is dynamically changed depending on a control state of the image pickup device 100, and processing speed that is dynamically changed depending on a control state of the lens. The time lag calculation unit 112 calculates the time (time lag) after the composition detection unit 111 issues the trigger to the image pickup control unit 113 but before the image pickup control unit 113 starts the image pickup processing, the time being caused by the above factors causing the time lag, and notifies the calculated time to the composition detection unit 111. The composition detection unit 111 issues the trigger to the image pickup control unit 113 in consideration of the time calculated by the time lag calculation unit 112.

The image pickup control unit 113 executes the image pickup processing in response to push of the shutter button 132 by a user or reception of the trigger for starting the image pickup operation from the composition detection unit 111. In response to the push of the shutter button 132 by the user or the reception of the trigger for starting the image pickup operation from the composition detection unit 111, the image pickup control unit 113 instructs the image pickup unit 102 to acquire a captured image. The captured image acquired in response to the instruction of the image pickup control unit 113 is stored in the flash memory 140 or is displayed in the display unit 120.

The composition specification unit 114 causes a user to specify an arbitrary composition. Information on the composition that the composition specification unit 114 causes the user to specify is stored in the flash memory 140. In a case were the composition specification unit 114 causes the user to specify the composition, the composition specification unit 114 causes the user to specify a target object (or a feature point of the object) and a position where the user wants the object to appear in an image.

In the above description, with reference to FIG. 3, there has been described the functional configuration example of the control unit 110 according to the embodiment of the present disclosure. Next, there will be described an operation example of the image pickup device 100 according to the embodiment of the present disclosure.

Operation Example of Image Pickup Device

Figure 4:
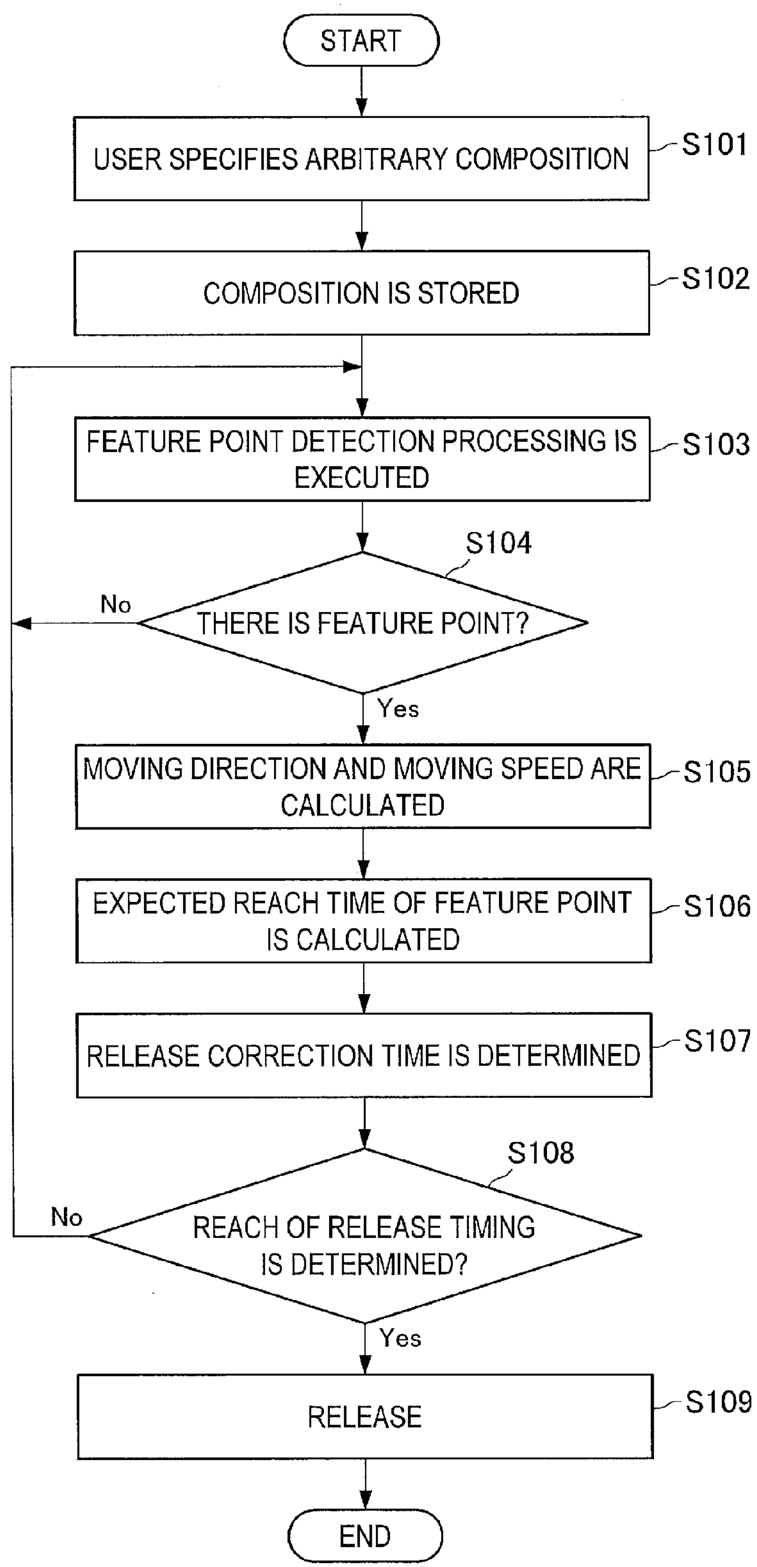
FIG. 4 is a flow chart illustrating an operation example of the image pickup device 100 according to an embodiment of the present disclosure.

FIG. 4 is a flow chart illustrating the operation example of the image pickup device 100 according to the embodiment of the present disclosure. FIG. 4 illustrates the operation example of the image pickup device 100 performed in a case where content of the image captured by the image pickup unit 102 is detected by the control unit 110 and the image pickup operation is automatically executed. Hereinafter, with reference to FIG. 4, there will be described the operation example of the image pickup device 100 according to the embodiment of the present disclosure.

First, the image pickup device 100 causes a user to specify an arbitrary composition (Step S101). This specification of the composition in Step S101 is executed by, for example, the composition specification unit 114. The image pickup device 100 causes the user to specify the arbitrary composition in Step S101 and then stores the specified composition (Step S102). Step S102 is executed by, for example, storing, in the flash memory 140, information on the composition that the composition specification unit 114 has caused the user to specify.

Figure 5:
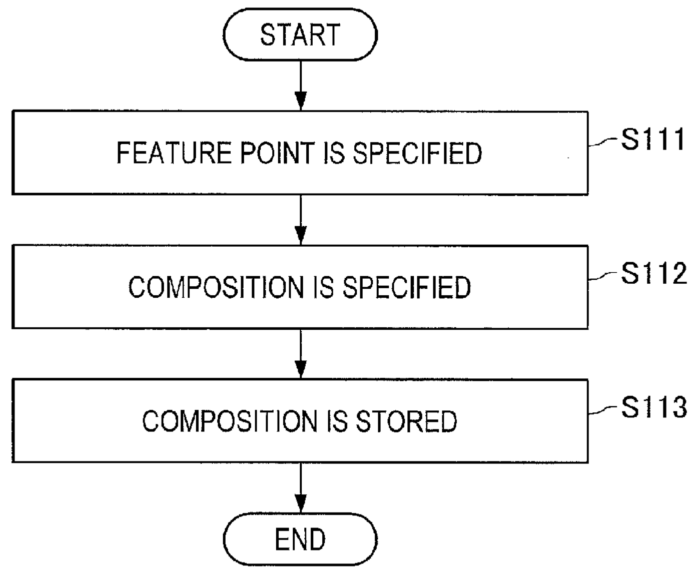
FIG. 5 is a flow chart illustrating an operation example of the image pickup device 100 according to an embodiment of the present disclosure.

FIG. 5 is a flow chart illustrating an operation example of the image pickup device 100 according to the embodiment of the present disclosure. FIG. 5 illustrates specification processing of the composition in Step S101 of FIG. 4 in more detail.

Figure 6:
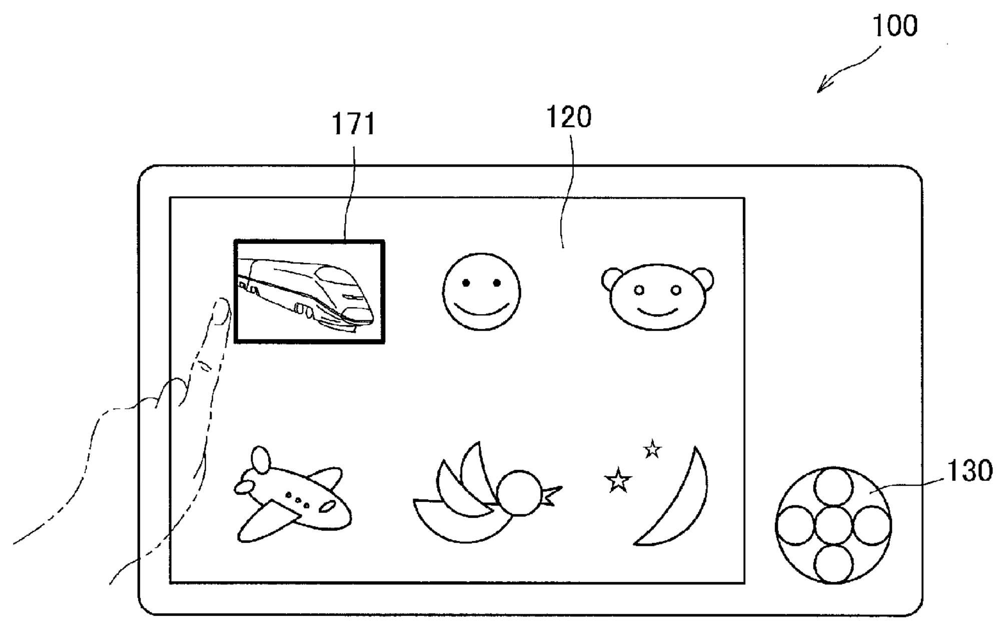
FIG. 6 is an explanatory diagram illustrating an example of a screen displayed in a display unit 120.

For example, the composition specification unit 114 causes a user to specify a feature point of a target object (Step S111). FIG. 6 is an explanatory diagram illustrating an example of a screen displayed in the display unit 120 in a case where the feature point of the target object is specified by the user in Step S111. As examples of the feature point of the object to be specified by the user, FIG. 6 illustrates, from upper left in a clockwise direction, a body of shinkansen (high-speed railway), a human face, a cat face, moon, a bird face, and a body of an air plane.

As a matter of course, the feature points of the object to be specified by the user are not limited to the above examples. For example, the image pickup device 100 may prepare examples of feature points of objects in advance and cause a user to select one of the examples or may cause a user to specify a feature point of an arbitrary substance. FIG. 6 illustrates a state in which the user selects the body of the shinkansen as the object, and the body of the shinkansen is surrounded by a frame line 171.

Because the touch panel 122 is provided in the image pickup device 100 in this embodiment, as illustrated in FIG. 6, the feature point of the object is specified by causing the user to touch the display unit 120 with his/her finger. As a matter of course, in the present disclosure, a method of specifying the feature point of the target object is not limited to the above example, and the feature point of the object may be specified by causing the user to operate the operation unit 130.

Figure 7:
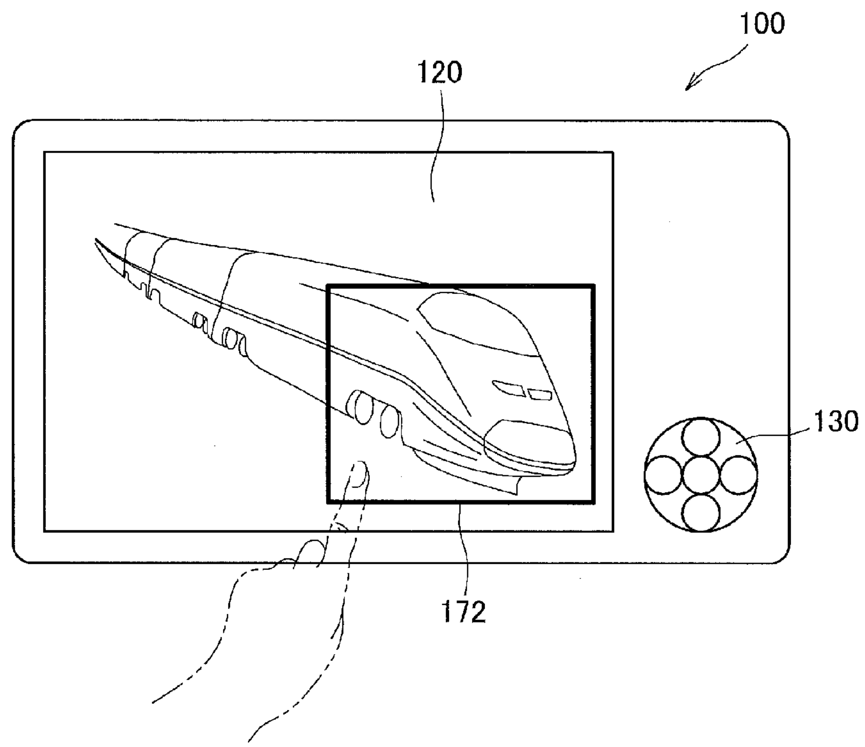
FIG. 7 is an explanatory diagram illustrating an example of a screen displayed in the display unit 120.

The feature point of the target object is specified by the user, and then, for example, the composition specification unit 114 causes the user to specify a composition by causing the user to specify a position of the specified feature point (Step S112). FIG. 7 is an explanatory diagram illustrating an example of a screen displayed in the display unit 120 when the composition is specified by the user in Step S112. Herein, FIG. 7 illustrates the example of the screen that is displayed in the display unit 120 in a case were the user selects the body of the shinkansen as the feature point of the object and specifies a position of the body of the shinkansen.

Because the touch panel 122 is provided in the image pickup device 100 in this embodiment, as illustrated in FIG. 7, the composition is specified by causing the user to touch the display unit 120 with his/her finger. FIG. 7 illustrates a frame line 172 for specifying the composition. As a matter of course, in the present disclosure, a method of specifying the composition is not limited to the above example, and the composition may be specified by causing the user to operate the operation unit 130.

The arbitrary composition is specified by the user as described above, and then, for example, the composition specification unit 114 stores the specified composition in the flash memory 140 (Step S102).

Referring back to FIG. 4, there will be provided continued description of the operation example of the image pickup device 100 according to the embodiment of the present disclosure. The composition specified by the user is stored in Step S102, and then the image pickup device 100 executes feature point detection processing to determine whether or not the feature point specified by the user is included in the image captured by the image pickup unit 102 (Step S103). The feature point detection processing is executed by, for example, the composition detection unit 111.

The feature point detection processing is executed in Step S103, and then the image pickup device 100 determines whether or not the feature point specified by the user is included in the image captured in the image pickup unit 102 (Step S104). This determination processing in Step S104 is executed by, for example, the composition detection unit 111.

As a result of the determination in Step S104, in a case where the feature point specified by the user is not included in the image captured in the image pickup unit 102, processing returns to Step S103, and the image pickup device 100 executes the feature point detection processing again. Meanwhile, as a result of the determination in Step S104, in a case where the feature point specified by the user is included in the image captured in the image pickup unit 102, the image pickup device 100 calculates a moving direction and a moving speed of the detected feature point (Step S105). Processing for calculating the moving direction and the moving speed of the detected feature point in Step S105 is executed by, for example, the composition detection unit 111.

Figure 8:
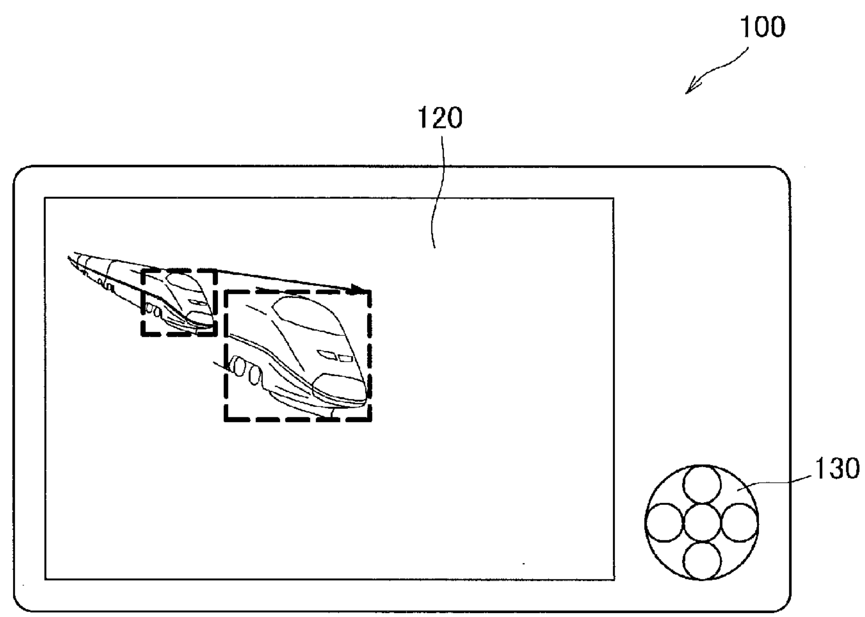
FIG. 8 is an explanatory diagram for describing processing for calculating a moving direction and a moving speed of a feature point.

FIG. 8 is an explanatory diagram for describing the processing for calculating the moving direction and the moving speed of the detected feature point in Step S105. For example, as illustrated in FIG. 8, the composition detection unit 111 can calculate the moving direction of the feature point by detecting that the feature point moves in a direction from upper left to lower right of an image. When it is detected that the detected feature point straightly moves as illustrated in FIG. 8, the composition detection unit 111 can calculate the moving speed of the feature point.

The moving direction and the moving speed of the detected feature point are calculated in Step S105, and then, in a case where the detected feature point straightly moves, the image pickup device 100 calculates a time at which the detected feature point reaches the position specified by the user (Step S106). This calculation processing of the time in Step S106 is executed by, for example, the composition detection unit 111.

Figure 9:
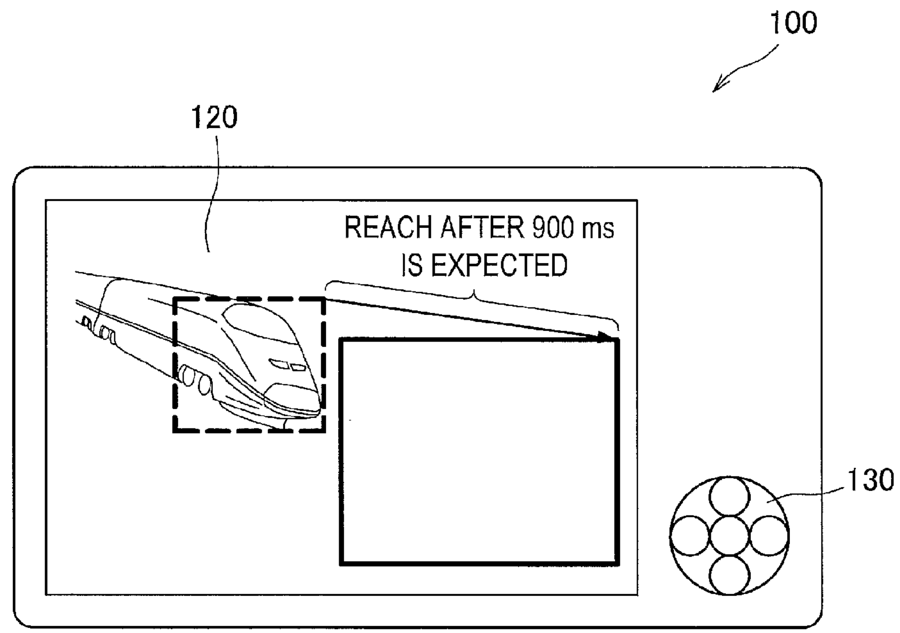
FIG. 9 is an explanatory diagram for describing calculation processing of a time.

FIG. 9 is an explanatory diagram for describing the calculation processing of the time in Step S106. For example, in a case where the detected feature point moves in the direction from the upper left to the lower right of the image, the composition detection unit 111 determines, by calculation, based on the moving speed of the feature point, that the feature point reaches the position specified by the user at, for example, a time T1 after 900 milliseconds.

The time at which the feature point reaches the position specified by the user is calculated in Step S106, and then the image pickup device 100 calculates a time lag after a trigger for starting image pickup is issued but before image pickup processing is started, thereby determining a release correction time (Step S107). The release correction time is a time corresponding to a difference between the time at which the feature point reaches the position specified by the user and a time at which the trigger for starting the image pickup is actually issued. This calculation processing of the time lag in Step S107 is executed by, for example, the time lag calculation unit 112.

As described above, examples of the factors causing the time lag include the inherent processing speed of the image pickup device 100, the driving speed of the shutter curtain and the aperture of the image pickup device 100, the inherent driving speed of the shutter curtain and the aperture of the lens, the processing speed that is dynamically changed depending on the control state of the image pickup device 100, and the processing speed that is dynamically changed depending on the control state of the lens. The time lag from a state of the image pickup device 100 or the lens is influenced by a processing property of the image pickup device 100.

The time lag calculation unit 112 calculates, in Step S107, the time after the composition detection unit 111 issues the trigger to the image pickup control unit 113 but before the image pickup control unit 113 starts the image pickup processing, the time being caused by the above factors, and notifies the calculated time to the composition detection unit 111.

Figure 10:
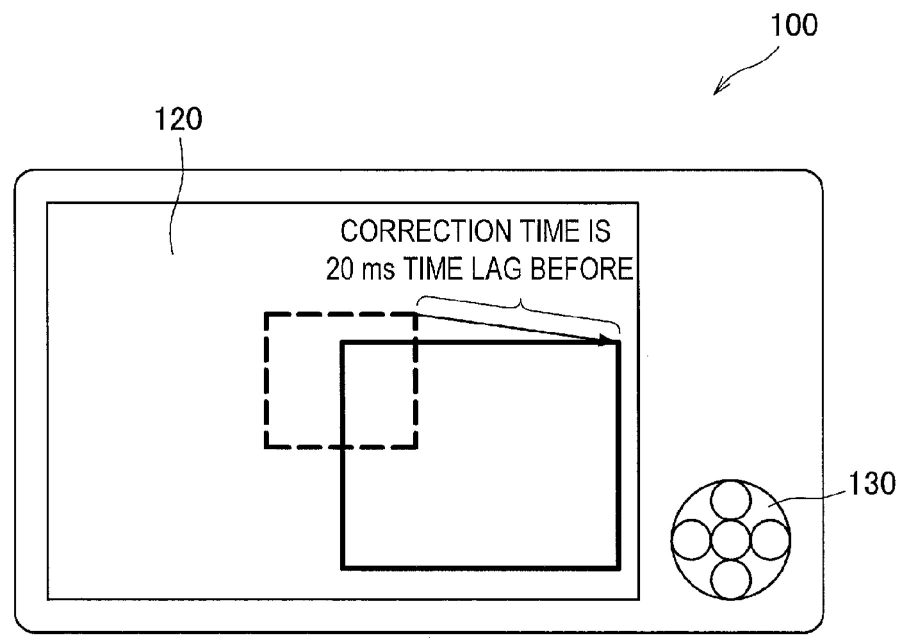
FIG. 10 is an explanatory diagram for describing calculation processing of a time lag.

FIG. 10 is an explanatory diagram for describing calculation processing of the time lag in Step S107. For example, as a result of the time lag calculation processing in Step S107, the time lag calculation unit 112 determines that the time lag after the trigger for starting the image pickup is issued but before the image pickup operation is started is 20 milliseconds and notifies information on the time lag to the composition detection unit 111.

Note that the time lag calculation unit 112 may obtain the time lag by calculation in a case where the feature point of the object is detected, but, in a case where the processing property of the image pickup device 100 is not high, the time lag calculation unit 112 may refer to a fixed value held in advance on the basis of a setting state of the image pickup device 100.

The release correction time is determined in Step S107, and then the image pickup device 100 determines whether or not a timing reaches the release timing on the basis of the time calculated in Step S106 and the release correction time determined in Step S107 (Step S108). This determination on whether or not a timing reaches the release timing in Step S108 is executed by, for example, the composition detection unit 111.

For example, in a case where the time T1 at which the feature point reaches the position specified by the user is calculated in Step S106 and the time lag (release correction time) after the trigger for starting the image pickup is issued but before the image pickup operation is started is calculated to be 20 milliseconds in Step S107, the image pickup device 100 issues the trigger for starting the image pickup 20 milliseconds before the time T1 calculated in Step S106, and therefore it is possible to capture an image in which the feature point exists in the position specified by the user.

As a result of the determination in Step S108, in a case where it is determined that a timing does not reach the release timing, the image pickup device 100 executes the feature point detection processing in Step S103 again. Meanwhile, as a result of the determination in Step S108, in a case where it is determined that a timing reaches the release timing, the image pickup device 100 performs release by issuing the trigger for starting the image pickup (Step S109). The trigger for starting the image pickup is issued to the image pickup control unit 113 by the composition detection unit 111.

As described above, the image pickup device 100 according to the embodiment of the present disclosure executes the automatic image pickup processing in consideration of the time lag after the trigger for starting the image pickup is issued but before the image pickup operation is started. As described above, by executing the automatic image pickup processing in consideration of the time lag, the image pickup device 100 according to the embodiment of the present disclosure can capture the image having the composition specified by the user as the user intended.

Note that the image pickup device 100 may display the image captured by the release in display unit 120 after the release is executed in Step S109, and, in a case where the image is displayed, the image pickup device 100 may overlap, on the image, the release correction time and a position of the object obtained when the release timing has not been corrected. In the above example, the image pickup device 100 may overlap the release correction time expressed as "20 msec" or the like on the image. The image pickup device 100 may express the position of the object obtained when the release timing has not been corrected by shifting the object through image processing, or may express the position with the use of an arbitrary mark or the like instead of the object.

As described above, because the release correction time and the position of the object obtained when the release timing has not been corrected are presented by overlapping the release correction time and the position on the image, improvement in a user's skill of using the image pickup device 100 can be expected in terms of the release timing.

In the above description, in a case where the object straightly moves in the image, the image pickup device 100 calculates the time T1 at which the feature point reaches the position specified by the user and the time lag after the trigger for starting the image pickup is issued but before the image pickup operation is started. However, the object to be captured by the user with the use of the image pickup device 100 does not necessarily move straightly in the image and may curvedly move in the image. In a case where the object to be captured by the user with the use of the image pickup device 100 curvedly moves, it is considered that, even in a case where the time lag is calculated as described above and the image pickup device 100 determines that a timing reaches the release timing, the object does not actually exist in the position specified by the user.

Therefore, in a case where the image pickup device 100 causes the user to specify the composition, a wider range may be specified instead of specification of one position, i.e., so-called specification of a pinpoint position on the screen. The image pickup device 100 specify, in advance, not only the pinpoint position but also a range in which the object is assumed to straightly move, and, when it is detected that the object enters the range, as described above, the image pickup device 100 may calculate the time T1 at which the feature point reaches the position specified by the user and the time lag after the trigger for starting the image pickup is issued but before the image pickup operation is started.

Figure 11:
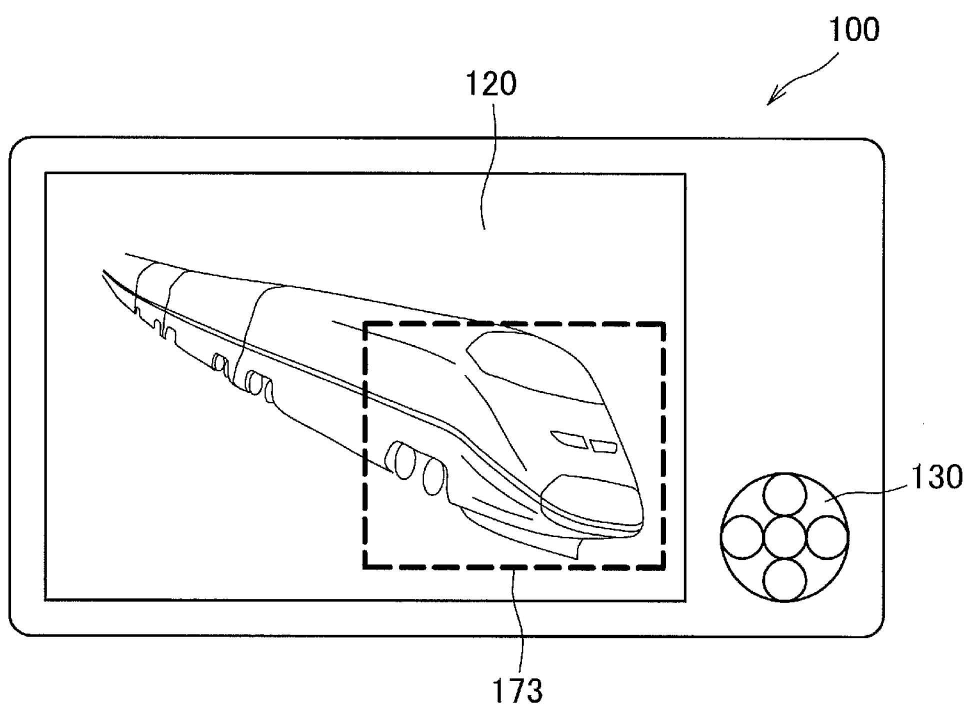
FIG. 11 is an explanatory diagram for describing a case where a wider range is specified by a user who uses the imaging device 100.

FIG. 11 is an explanatory diagram for describing a case where a wider range is specified by a user who uses the image pickup device 100 instead of specification of a pinpoint position. A reference sign 173 of FIG. 11 is a frame line indicating a range specified by the user. As illustrated in FIG. 11, the composition specification unit 114 may cause the user to specify the wider range, as compared with a case where the pinpoint position is specified.

The image pickup device 100 may automatically determine whether to specify the pinpoint position or specify the wider range on the basis of motion of the feature point. For example, in a case where the feature point straightly moves within a range of a certain time, the image pickup device 100 may execute the automatic image pickup processing while a pinpoint position is specified.

In the above description, the image pickup device 100 executes the automatic image pickup processing of the still image in consideration of the time lag after the trigger for starting the image pickup is issued but before the image pickup operation is started. However, the present disclosure is not limited to the above example.

For example, the image pickup device 100 may start image pickup operation of a moving image when an object reaches the vicinity of a location specified by a user and terminate the image pickup operation of the moving image when the object departs from the vicinity of the location specified by the user. The image pickup device 100 may extract a frame in which the object exists in the location specified by the user from the moving image captured as described above and record the frame as a still image.

2. CONCLUSION

As described above, according to the embodiment of the present disclosure, it is possible to provide the image pickup device 100 that executes automatic image pickup processing of a still image in consideration of a time lag after a trigger for starting image pickup is issued but before image pickup operation is started. By executing the automatic image pickup processing of the still image in consideration of the time lag, even in a case where an object moves at a high speed, the image pickup device 100 can capture a still image having a composition intended by a user.

Steps in processes executed by devices in this specification are not necessarily executed chronologically in the order described in a sequence chart or a flow chart. For example, Steps in processes executed by devices may be executed in a different order from the order described in a flow chart or may be executed in parallel.

Further, a computer program can be created which causes hardware such as a CPU, ROM, or RAM, incorporated in each of the devices, to function in a manner similar to that of structures in the above-described devices. Furthermore, it is possible to provide a recording medium having the computer program recorded thereon. Moreover, by configuring respective functional blocks shown in a functional block diagram as hardware, the hardware can achieve a series of processes.

In the embodiment of the present disclosure described above, the description has been provided by exemplifying a digital still camera. However, a device to which the present disclosure is applied is not limited to the above example. It is needless to say that, for example, the technology in the present disclosure can be similarly applied to a mobile phone, a game console, a personal computer, a tablet terminal, and other information processing devices, in each of which a camera is mounted.

The preferred embodiments of the present disclosure have been described above with reference to the accompanying drawings, whilst the present disclosure is not limited to the above examples, of course. A person skilled in the art may find various alterations and modifications within the scope of the appended claims, and it should be understood that they will naturally come under the technical scope of the present disclosure.

Additionally, the present technology may also be configured as below.

(1)

An image pickup device including:

a composition detection unit configured to calculate a time at which an object that is specified by a user and is included in a captured image achieves a composition specified by the user;

a time calculation unit configured to calculate a time after start instruction of image pickup operation is issued but before an image is captured; and an image pickup control unit configured to start image pickup processing of the image in response to the start instruction of the image pickup operation, wherein the composition detection unit issues the start instruction of the image pickup operation to the image pickup control unit the time calculated by the time calculation unit before the time at which the composition specified by the user is achieved.

(2)

The image pickup device according to (1), wherein the time calculation unit calculates the time in consideration of a processing time that dynamically changes in accordance with a control state of the image pickup device.

(3)

The image pickup device according to (1) or (2), wherein the image pickup control unit overlaps information on the time calculated by the time calculation unit on the image obtained by the image pickup operation executed based on the instruction from the composition detection unit.

(4)

The image pickup device according to any one of (1) to (3), wherein the image pickup control unit overlaps information on a position of the object obtained when the image pickup operation is executed at the time calculated by the composition detection unit on the image obtained by the image pickup operation executed based on the instruction from the composition detection unit.

(5)

The image pickup device according to (4), wherein the image pickup control unit extracts the object and uses the object as the information on the position of the object.

(6)

The image pickup device according to any one of (1) to (5), wherein the composition detection unit issues the start instruction of the image pickup operation to the image pickup control unit as long as the object is included in the captured image.

(7)

The image pickup device according to any one of (1) to (6), wherein the composition detection unit changes, in accordance with a specification method of the composition by the user, a timing to start calculation of the time at which the composition specified by the user is achieved.

(8)

The image pickup device according to (7), wherein the specification method of the composition by the user is changed depending on whether the object straightly moves or curvedly moves.

(9)

A method of controlling an image pickup device, including:

a composition detection step of calculating a time at which an object that is specified by a user and is included in a captured image achieves a composition specified by the user;

a time calculation step of calculating a time after start instruction of image pickup operation is issued but before an image is captured; and an image pickup control step of starting image pickup processing of the image in response to the start instruction of the image pickup operation, wherein in the composition detection step, the start instruction of the image pickup operation is issued in the image pickup control step the time calculated in the time calculation step before the time at which the composition specified by the user is achieved.

(10)

A computer program that causes a computer to perform:

a composition detection step of calculating a time at which an object that is specified by a user and is included in a captured image achieves a composition specified by the user;

a time calculation step of calculating a time after start instruction of image pickup operation is issued but before an image is captured; and an image pickup control step of starting image pickup processing of the image in response to the start instruction of the image pickup operation, wherein in the composition detection step, the start instruction of the image pickup operation is issued in the image pickup control step the time calculated in the time calculation step before the time at which the composition specified by the user is achieved.

REFERENCE SIGNS LIST

100 image pickup device
102 image pickup unit
110 control unit
111 composition detection unit
112 time lag calculation unit
113 image pickup control unit
114 composition specification unit
120 display unit
130 operation unit
131 zoom button
132 shutter button
133 power button
140 flash memory
150 RAM
160 bus

The invention claimed is:

1. An image pickup device, comprising:

one or more processors configured to:

calculate a first time at which an object that is specified by a user and is included in a captured image achieves a composition specified by the user, wherein the object is specified by selecting a feature point representing the object among a plurality of feature points representing a plurality of objects;

calculate a second time after start instruction of image pickup operation is issued but before an image is captured; and start image pickup processing of the image in response to the start instruction of the image pickup operation, wherein the one or more processors are configured to issue the start instruction of the image pickup operation at a third time based on the calculated first time and the calculated second time.

2. The image pickup device according to claim 1, wherein the one or more processors are configured to calculate the second time in consideration of a processing time that dynamically changes in accordance with a control state of the image pickup device.

3. The image pickup device according to claim 1, further comprising:

a display unit configured to display the captured image, wherein the one or more processors are configured to overlap information representing the second time on the displayed image obtained by the image pickup operation executed based on an instruction from the one or more processors.

4. The image pickup device according to claim 1, further comprising:

a display unit configured to display the captured image, wherein the one or more processors are configured to overlap information representing a position of the object obtained in an event the image pickup operation is executed at the third time on the displayed image obtained by the image pickup operation executed based on the start instruction from the one or more processors.

5. The image pickup device according to claim 4, wherein the one or more processors are configured to extract the object and use the object as the overlap information on the position of the object.

6. The image pickup device according to claim 1, wherein the one or more processors are configured to issue the start instruction of the image pickup operation till the object is at a determined distance from the specified composition.

7. The image pickup device according to claim 1, wherein the one or more processors are configured to change, in accordance with a specification method of the composition by the user, a timing to start calculation of the first time at which the composition specified by the user is achieved.

8. The image pickup device according to claim 7, wherein the specification method of the composition by the user is changed depending on whether the object straightly moves or curvedly moves.

9. The image pickup device according to claim 1, wherein the calculated second time indicates an amount of time that is elapsed after the start instruction of the image pickup operation is issued but before the image is captured, and the one or more processors are configured to issue the start instruction of the image pickup operation the amount of time before the first time at which the composition specified by the user is achieved.

10. A method of controlling an image pickup device, comprising:

calculating a first time at which an object that is specified by a user and is included in a captured image achieves a composition specified by the user, wherein the object is specified by selecting a feature point representing the object among a plurality of feature points representing a plurality of objects;

calculating a second time after start instruction of image pickup operation is issued but before an image is captured; and starting image pickup processing of the image in response to the start instruction of the image pickup operation, wherein the start instruction of the image pickup operation is issued at a third time based on the calculated first time and the calculated second time.

11. A non-transitory computer readable storage medium having stored thereon, a set of computer executable instructions, for causing a computer to perform operations comprising:

calculating a first time at which an object that is specified by a user and is included in a captured image achieves a composition specified by the user, wherein the object is specified by selecting a feature point representing the object among a plurality of feature points representing a plurality of objects;

calculating a second time after start instruction of image pickup operation is issued but before an image is captured; and starting image pickup processing of the image in response to the start instruction of the image pickup operation, wherein the start instruction of the image pickup operation is issued at a third time based on the calculated first time and the calculated second time.

* * * * *